(12) United States Patent
Liu

(10) Patent No.: US 10,021,914 B2
(45) Date of Patent: Jul. 17, 2018

(54) ATOMIZATION ASSEMBLY, ELECTRONIC CIGARETTE WITH A LIMITED LIFETIME AND METHOD OF LIMITING THE LIFETIME OF THE ELECTRONIC CIGARETTE

(71) Applicant: HUIZHOU KIMREE TECHNOLOGY CO., LTD., Huizhou, Guangdong (CN)

(72) Inventor: Qiuming Liu, Shenzhen (CN)

(73) Assignee: HUIZHOU KIMREE TECHNOLOGY CO., LTD., Huizhou, Guangdong (CN)

( * ) Notice: Subject to any disclaimer, the term of this patent is extended or adjusted under 35 U.S.C. 154(b) by 0 days.

(21) Appl. No.: 15/502,683

(22) PCT Filed: Nov. 24, 2014

(86) PCT No.: PCT/CN2014/092035
§ 371 (c)(1),
(2) Date: Feb. 8, 2017

(87) PCT Pub. No.: WO2016/082077
PCT Pub. Date: Jun. 2, 2016

(65) Prior Publication Data
US 2017/0224022 A1    Aug. 10, 2017

(51) Int. Cl.
*A24F 47/00* (2006.01)
*H05B 1/02* (2006.01)
(Continued)

(52) U.S. Cl.
CPC .......... *A24F 47/008* (2013.01); *G06F 13/102* (2013.01); *G06F 13/16* (2013.01);
(Continued)

(58) Field of Classification Search
None
See application file for complete search history.

(56) References Cited

U.S. PATENT DOCUMENTS

| 2014/0251324 | A1 | 9/2014 | Xiang |
| 2014/0338685 | A1 | 11/2014 | Amir |
| 2016/0316821 | A1* | 11/2016 | Liu .................. A24F 47/008 |

FOREIGN PATENT DOCUMENTS

| CN | 102940313 A | 2/2013 |
| CN | 103271446 A | 9/2013 |
| CN | 103734915 A | 4/2014 |

OTHER PUBLICATIONS

International Search Report (ISR) issued by the State Intellectual Property Office of the Peoples Republic of China dated Sep. 9, 2015 for PCT/CN2014/092035, China.

* cited by examiner

*Primary Examiner* — Tho D Ta
(74) *Attorney, Agent, or Firm* — Tim Tingkang Xia, Esq.; Locke Lord LLP

(57) ABSTRACT

The present application discloses an atomization assembly, an electronic cigarette with a limited lifetime and a method of limiting a lifetime of the electronic cigarette. The atomization assembly includes an interface circuit detachably connected with the battery assembly, an atomization circuit and a main circuit. The atomization circuit and the main circuit are both connected with the interface circuit. The main circuit is used to count the puff number according to actual conducting times of the atomization circuit, after electrically communicated with the battery assembly via the interface circuit, so that the electronic cigarette controls the atomizing circuit to be disconnected and stopped from working when the puff number reaches a preset value. A technical effect is achieved that exactly counting the puff (Continued)

number and effectively ensuring the consistency between the available puff number and available amount of tobacco tar.

10 Claims, 9 Drawing Sheets

(51) Int. Cl.
*G06F 13/10* (2006.01)
*G06F 13/16* (2006.01)
*G06F 13/40* (2006.01)

(52) U.S. Cl.
CPC ...... *G06F 13/4022* (2013.01); *G06F 13/4068* (2013.01); *H05B 1/0244* (2013.01); *H05B 2203/021* (2013.01)

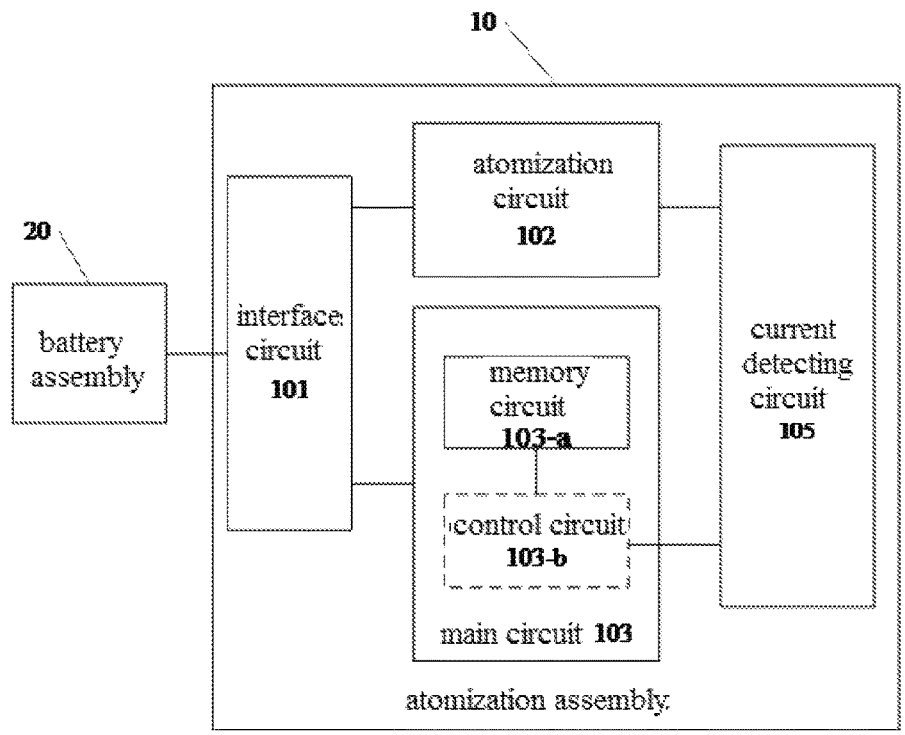

Fig. 10B

After a battery component electrically communicated to an atomizing component via an interface circuit, getting mouth number of smoking according to the number of actual conduction of an atomizing circuit — S1

Controlling the atomizing circuit based on the mouth number of smoking, and controlling the atomizing circuit disconnected when the mouth number of smoking reaches a preset value, so that an electronic cigarette stops working — S2

Fig. 11

ATOMIZATION ASSEMBLY, ELECTRONIC CIGARETTE WITH A LIMITED LIFETIME AND METHOD OF LIMITING THE LIFETIME OF THE ELECTRONIC CIGARETTE

FIELD OF THE INVENTION

This invention relates to the field of electronic cigarette, and more particularly to an atomization assembly, an electronic cigarette with a limited lifetime and a method of limiting the lifetime of the electronic cigarette.

BACKGROUND OF THE INVENTION

Electronic cigarettes, as simulation cigarettes, are common electronic products. The electronic cigarettes are mainly used for quitting smoking and substituting conventional cigarettes. The main structure of an electronic cigarette includes a battery assembly and an atomization assembly. When a smoking motion is detected, the battery assembly supplies power to the atomization assembly, in order to make the atomization assembly be in an open state. After the atomization assembly is opened, the heater heats, and the tobacco tar is vaporized and atomized under being heated to form fog that simulates smoke, so that the users feel like smoking a conventional cigarette when smoking the electronic cigarette.

In the early days, the atomization assembly of many electronic cigarettes does not have the function of lifetime (such as puff number) limiting. The atomization assembly will be electrified to work as soon as it is power supplied by the battery assembly. In an early stage of using, the tobacco tar is abundant, thus the smoke tastes are pure. However, in the late stages of using, the tobacco tar is in short supply, which leads to a decrease of the amount of smoke, and even causes the problem of burning the cotton to smell bad, thereby giving users a very bad experience.

Currently, aim at the above-mentioned problems, there are some relevant literature suggesting improving the structure of the electronic cigarette by adding a control unit into the battery assembly to avoid the circumstance that the amount of smoke is reduced and the cotton is burned due to reduction of the tobacco tar. The control unit is used to count the puff number and disconnect the atomization assembly when the puff number reaches a preset value. However, in prior technical solutions, as long as the electronic cigarette receives a smoking signal, such as a smoking signal formed by triggering a button, the control unit starts counting the puff number and reducing the remaining available puff number at the same time. However, in actual use, there may be a situation that the atomization assembly is disconnected from the battery assembly, such as the atomization assembly is loosen and disconnected from the battery assembly, or the battery assembly is placed alone and not connected with the atomization assembly, and so on. In these cases, the control unit and the battery of the battery assembly are still connected to each other. When a smoking signal is generated by the user's trigger by mistake (such as the user accidentally hits the button of triggering smoking or a child plays to issue a smoking motion to the electronic cigarette, and so on), the control unit would still count the puff number, and reduce the remaining available puff number, while the atomization assembly does not start working actually and the tobacco tar is not consumed at all. In this way, the remaining available puff number is reduced in vain. That is to say, when the puff number counted by the control unit reaches the preset value and the electronic cigarette is unavailable, the electronic cigarette remains available tobacco tar.

In other words, there is a technical problem in prior art that when limiting the puff number, the electronic cigarettes cannot exactly count the puff number, which causes the electronic cigarettes to be poor in product consistency.

SUMMARY OF THE INVENTION

Aiming at the technical problem of poor product consistency in prior art caused by that when limiting the puff number, the electronic cigarettes cannot exactly count the puff number, the present invention provides an atomization assembly, an electronic cigarette with a limited lifetime and a method of limiting the lifetime of the electronic cigarette, to achieve a technical effect of exactly counting the puff number and effectively ensuring the consistency between the available puff number and the available amount of tobacco tar.

In a first aspect, the present invention provides an atomization assembly, used to be combined with a battery assembly to form an electronic cigarette, the atomization assembly includes an interface circuit configured to be detachably connected with the battery assembly, an atomization circuit and a main circuit; the atomization circuit and the main circuit are both connected with the interface circuit;

the main circuit is used to count puff number according to actual conducting times of the atomization circuit, after electrically communicated with the battery assembly via the interface circuit, so that the electronic cigarette controls the atomization circuit to be disconnected and stopped from working when the puff number reaches a preset value.

Preferably, the main circuit is used to count the puff number according to actual conducting times of the atomization circuit, and provide the puff number for the battery assembly when electrically communicated with the battery assembly, so that the battery assembly controls the atomization circuit to be disconnected and stopped from working when the puff number reaches the preset value;

or the main circuit is used to count the puff number according to actual conducting times of the atomization circuit, and control the atomization circuit to be disconnected and stopped from working when the puff number reaches the preset value.

Preferably, the main circuit is a memory IC, which provides the puff number for the battery assembly via the interface circuit, so that the battery assembly controls the atomization circuit to be disconnected and stopped from working when the puff number reaches the preset value.

Preferably, the main circuit includes a processing chip with a built-in nonvolatile memory;

the nonvolatile memory is used to count the puff number according to actual conducting times of the atomization circuit;

the processing chip further includes a control module connected with the atomization circuit; the control module is used to receive the puff number from the nonvolatile memory after electrically communicated with the battery assembly via the interface circuit, and control the atomization circuit to be disconnected when the puff number reaches the preset value.

Preferably, the main circuit includes an external memory, used to count the puff number according to actual conducting times of the atomization circuit; and a control chip, connected with the external memory and the atomization circuit; the control chip is used to receive the puff number from the external memory after electrically communicated with the battery assembly via the interface circuit, and control the atomization circuit to be disconnected when the puff number reaches the preset value.

Preferably, the atomization circuit includes a switch element;

wherein the electronic cigarette controls the switch element to be turned off when the puff number reaches the preset value, in order to disconnect the atomization circuit.

Preferably, the atomization assembly further includes a temperature detecting circuit connected with the atomization circuit and the main circuit;

the temperature detecting circuit is used to detect a temperature signal of a heating device of the atomization circuit after the main circuit is electrically communicated with the battery assembly, and feedback an actual conduction situation of the atomization circuit to the main circuit based on the temperature signal.

Preferably, the atomization assembly further includes a current detecting circuit connected with the atomization circuit and the main circuit; the current detecting circuit is used to detect a current signal of the atomization circuit after the main circuit is electrically communicated with the battery assembly, and feedback the actual conduction situation of the atomization circuit to the main circuit based on the current signal.

In a second aspect, the present application further provides an electronic cigarette with a limited lifetime; the electronic cigarette includes an atomization assembly and a battery assembly; the atomization assembly comprises an interface circuit configured to be detachably connected with the battery assembly, and an atomization circuit connected with the interface circuit;

the electronic cigarette further includes a main circuit which includes a memory circuit and a control circuit; the control circuit is defined in the atomization assembly or the battery assembly; the memory circuit is defined in the atomization assembly;

the memory circuit is used to count puff number according to actual conducting times of the atomization circuit, and transfer the puff number to the control circuit, after electrically communicated with the battery assembly via the interface circuit, so that the control circuit controls the atomization circuit to be disconnected and stopped from working when the puff number reaches a preset value.

Preferably, the control circuit is defined in the battery assembly;

the memory circuit is a memory IC, used to count the puff number according to actual conducting times of the atomization circuit, and provide the puff number for the control circuit when electrically communicated with the battery assembly, so that the control circuit controls the atomization circuit to be disconnected and stopped from working when the puff number reaches the preset value.

Preferably, the memory IC provides the puff number for the control circuit via the interface circuit.

Preferably, the main circuit includes a processing chip with a built-in nonvolatile memory; the processing chip includes the memory circuit and the control circuit;

the memory circuit is the nonvolatile memory, used to count the puff number according to actual conducting times of the atomization circuit;

the control circuit is a control module that is built in the processing chip and connected with the atomization circuit; the control circuit is used to receive the puff number from the nonvolatile memory after electrically communicated with the battery assembly via the interface circuit, and control the atomization circuit to be disconnected when the puff number reaches the preset value.

Preferably, the memory circuit is an external memory, used to count the puff number according to actual conducting times of the atomization circuit;

the control circuit is a control chip, connected with the external memory and the atomization circuit; the control chip is used to receive the puff number from the external memory after electrically communicated with the battery assembly via the interface circuit, and control the atomization circuit to be disconnected when the puff number reaches the preset value.

Preferably, the atomization circuit includes a switch element;

wherein the electronic cigarette controls the switch element to be turned off when the puff number reaches the preset value, in order to disconnect the atomization circuit.

Preferably, the atomization assembly further includes a temperature detecting circuit connected with the atomization circuit and the main circuit; the temperature detecting circuit is used to detect a temperature signal of a heating device of the atomization circuit after the control circuit is electrically communicated with the battery assembly, and feedback an actual conduction situation of the atomization circuit to the control circuit based on the temperature signal.

Preferably, the atomization assembly further includes a current detecting circuit connected with the atomization circuit and the control circuit; the current detecting circuit is used to detect a current signal of the atomization circuit after the control circuit is electrically communicated with the battery assembly, and feedback an actual conduction situation of the atomization circuit to the control circuit based on the current signal.

Preferably, the battery assembly includes a smoking motion detector, used to detect a user's smoking motion;

wherein after the smoking motion detector has detected the user's smoking motion, and when the battery assembly is physically connected with the atomization assembly via the interface circuit, the battery assembly supplies power to the main circuit via the interface circuit.

In a third aspect, the present application further provides a method of limiting a lifetime of an electronic cigarette, used to limit the lifetime of above the electronic cigarette; the method includes steps as follows:

S1. After a battery assembly is electrically communicated with an atomization assembly via an interface circuit, receiving puff number according to actual conducting times of an atomization circuit;

One or more technical solutions, provided in the present invention, at least have the following technical effects or advantages:

The present application provides one or more technical solutions, which can be achieved the following advantageous effects:

In the present invention, the atomization assembly of the electronic cigarette includes an interface circuit detachably connected with the battery assembly, an atomization circuit and a main circuit; the atomization circuit and the main circuit are both connected with the interface circuit. The main circuit is used to count puff number according to actual conducting times of the atomization circuit, after electrically communicated with the battery assembly via the interface circuit, so that the electronic cigarette controls the atomization circuit to be disconnected and stopped from working when the puff number reaches a preset value. In other words, by arranging the main circuit used to count the puff number in the atomization assembly, it is unable for the control unit, which controls the on/off of the atomizer based on the puff number, to operate the puff number stored in the atomization assembly when the atomization assembly is disconnected with power source. Further, as the main circuit counts the puff number according to the actual conducting times of the atomization circuit, it is also unable for the control unit to operate the puff number stored in the atomization assembly when the atomization circuit is open (such as the resistive heater is breakdown), even though the main circuit is connected with the battery assembly at this moment. The main circuit counts the puff number after ensuring that the atomization circuit is conducted and the resistive heater is actually working, and then the counted puff number is provided for the control unit. The technical problem of poor product consistency in prior art caused by that when limiting the puff number, the electronic cigarettes cannot exactly count the puff number, has been solved effectively. It can achieve a technical effect of exactly counting the puff number when limiting the puff number and effectively ensuring the product consistency (i.e. the available puff number and the available amount of tobacco tar are matched).

BRIEF DESCRIPTION OF THE DRAWINGS

In order to illustrate the technical solutions of embodiments of the present invention or prior art more clearly, the drawings used in the embodiments of the present invention or in prior art will be described in the following. Apparently, the following drawings are merely used for the embodiments of the present invention, and other drawings can further be obtained according to the drawings provided by those with ordinary skill in the art without paying creative work.

FIG. 1A illustrates a block diagram of an atomization assembly, which is provided according to the embodiments of the present invention;

FIG. 1B illustrates a block diagram of the atomization assembly connected with a battery assembly, which is provided according to the embodiments of the present invention;

FIG. 10A-10B illustrates another two kinds of schematics for determining whether the atomization circuit is actually conducted or not, which are provided according to the embodiments of the present invention;

FIG. 11 illustrates a flowchart of a method of limiting the lifetime of the electronic cigarette, which is provided according to the embodiments of the present invention.

DETAILED DESCRIPTION OF THE PREFERRED EMBODIMENTS

Figure 2A:
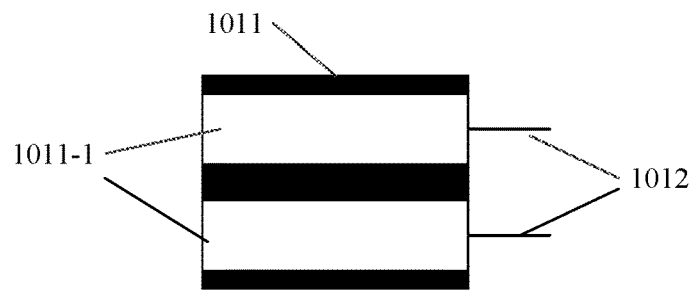
FIGS. 2A-2B illustrates a schematic diagram of an interface circuit of the atomization assembly, which is provided according to the embodiments of the present invention.

By providing an atomization assembly, the embodiment of the present invention has solved the technical problem of poor product consistency in prior art caused by that when limiting the puff number, the electronic cigarettes can not exactly count the puff number. It can achieve a technical effect of exactly counting the puff number and effectively ensuring the product consistency.

In order to solve the above-mentioned technical problem, general ideas of the technical solution of the embodiment of the present invention are as follows:

The embodiment of the present invention provides an atomization assembly, which is used to be combined with a battery assembly to form an electronic cigarette. The atomization assembly includes an interface circuit detachably connected with the battery assembly, an atomization circuit and a main circuit. The atomization circuit and the main circuit are both connected with the interface circuit. The main circuit is used to count the puff number according to actual conducting times of the atomization circuit, after electrically communicated with the battery assembly via the interface circuit, so that the electronic cigarette controls the atomizing circuit to be disconnected and stopped from working when the puff number reaches a preset value.

Obviously, in the embodiment of the present invention, by arranging the main circuit used to count the puff number in the atomization assembly, it is unable for the control unit, which controls the on/off of the atomizer based on the puff number, to operate the puff number stored in the atomization assembly when the atomization assembly is disconnected with power source. Further, as the main circuit counts the puff number according to the actual conducting times of the atomization circuit, it is also unable for the control unit to operate the puff number stored in the atomization assembly when the atomization circuit is open (such as the resistive heater is breakdown), even though the main circuit is connected with the battery assembly at this moment. The main circuit counts the puff number after ensuring that the atomization circuit is conducted and the resistive heater is actually working, and then the counted puff number is provided for the control unit. The technical problem of poor product consistency in prior art caused by that when limiting the puff number, the electronic cigarettes cannot exactly count the puff number, has been solved effectively. It can achieve a technical effect of exactly counting the puff number when limiting the puff number and effectively ensuring the product consistency (i.e. the available puff number and the available amount of tobacco tar are matched).

For better understanding, the above-mentioned technical solution will be described in detail associated with the drawings and specific embodiments in the following. It should be understood that both the embodiments of the present invention and specific features in the embodiments are used to describe, rather than to limit, the technical solution of the present invention. The embodiments of the present invention and the specific features in the embodiments may be combined with each other without conflicting to each other.

The First Embodiment

Figures 1A, 1B:
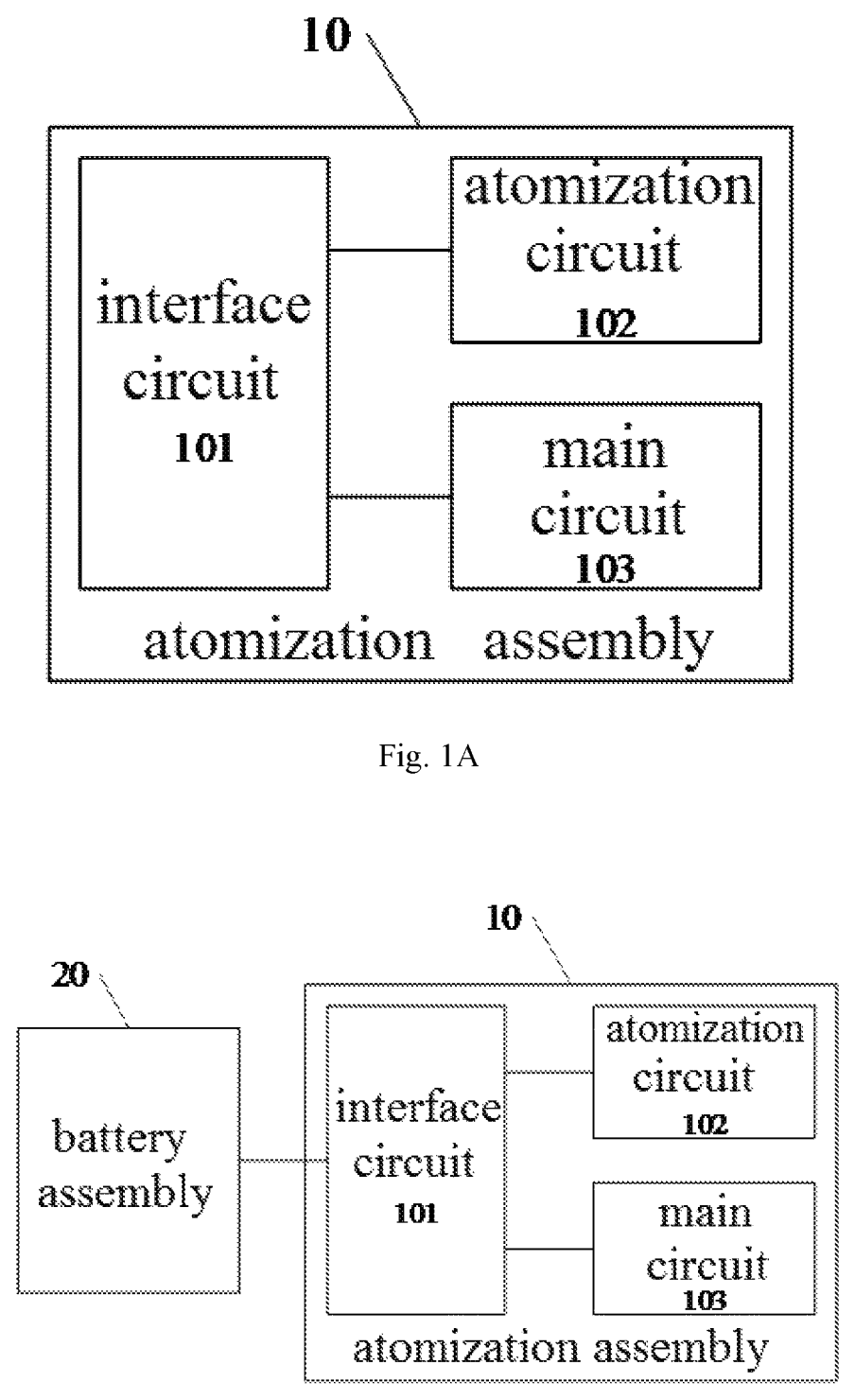

Referring to FIGS. 1A and 1B, the embodiment of the present invention provides an atomization assembly 10 which is used to be combined with a battery assembly 20 to form an electronic cigarette. The atomization assembly 10 includes
an interface circuit 101 detachably connected with the battery assembly 20, an atomization circuit 102 and a main circuit 103. The atomization circuit 102 and the main circuit 103 are both connected with the interface circuit 101.

The main circuit 103 is used to count the puff number according to actual conducting times of the atomization circuit 102, after electrically communicated with the battery assembly 20 via the interface circuit 101, so that the electronic cigarette controls the atomization circuit 102 to be disconnected and stopped from working, when the puff number reaches a preset value.

Figure 2B:
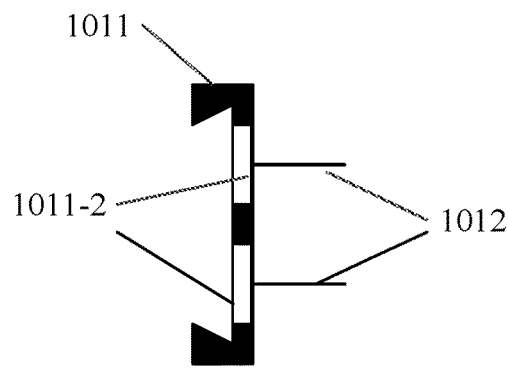

In the embodiment of the present application, the atomization assembly 10 and the battery assembly 20 of the electronic cigarette are detachably connected with each other. Specifically, referring to FIGS. 2A and 2B, the interface circuit 101 includes a connector 1011 and a plurality of connection lines 1012 led out from the connector 1011 and connected with the atomization circuit 102 and the main circuit 103. As shown in FIG. 2A, the connector 1011 is an extension socket with pin holes 1011-1 arranged side by side. Accordingly, the battery assembly 20 is provided with a row of pin headers matched to the extension socket. By inserting the pin headers into the pin holes 1011-1 or pulling the pin headers out of the pin holes 1011-1, the detachable connection between the battery assembly 20 and the atomization assembly 10 can be realized. The number of the pin holes 1011-1 depends on the specific circumstances. For example, as the battery assembly 20 mainly supplies power for the atomization assembly 10 via the interface circuit 101, the pin holes 1011-1 include one hole for power supply and another hole for ground. Further as shown in FIG. 2B, the connector 1011 is a clamping socket with contact points 1011-2 arranged side by side. Accordingly, the battery assembly 20 is provided with some other contact points matched to the contact points 1011-2 of the clamping socket. By inserting the battery assembly 20 into the clamping socket or pulling the battery assembly 20 out of the clamping socket, the detachable connection between the battery assembly 20 and the atomization assembly 10 is realized. Similarly, the number of contact points 1011-2 depends on the specific circumstances, and it is not specifically limited here.

In actual implementation, the battery assembly 20 includes a smoking motion detector used to detect a user's smoking motion. The smoking motion detector can be an airflow sensor or a touching switch and so on, which is not specifically limited here. After the smoking motion detector has detected the user's smoking motion, and when the battery assembly 20 is physically connected with the atomization assembly 10 via the interface circuit 101, the battery assembly 20 supplies power to the main circuit 103 via the interface circuit 101. The main circuit 103 counts the puff number according to the actual conducting times of the atomization circuit 102. The term "actual conducting" means that the atomization circuit 102 receives electricity power from the battery assembly 20 to atomize tobacco tar effectively. Particularly, the atomization circuit 102 includes a heating device (such as a resistance wire). When the atomization circuit 102 actually conducts and has no fault, the heating device heats and the tobacco tar is vaporized and atomized under being heated. Further, the electronic cigarette controls the atomization circuit 102 based on the puff number, and when the puff number reaches the preset value, the electronic cigarette controls the atomization circuit 102 to be disconnected and stopped from working. In addition, what deserves special mention is that the preset value above-mentioned can be set according to the statistics on the components of the tobacco tar, the volume of tobacco tar and the consumption of the tobacco tar for each puff. The preset value can specifically be 290 or 300 and so on, which is not specifically limited here.

In actual implementation, the main circuit 103 is used to count the puff number according to the actual conducting times of the atomization circuit 102, and provide the puff number to the battery assembly 20 when the main circuit 103 is electrically communicated with the battery assembly 20, so that the battery assembly 20 controls the atomization circuit 102 to be disconnected and stopped from working when the puff number reaches the preset value. Alternatively, the main circuit 103 is used to count the puff number according to actual conducting times of the atomization circuit 102, and control the atomization circuit 102 to be disconnected and stopped from working when the puff number reaches the preset value. In other words, the controller of the electronic cigarette, which is used to control the atomization circuit 102 to be turned on or turned off, can be arranged either in the atomization assembly 10 or in the battery assembly 20. The two cases will be respectively described in the following:

1) The first case: the controller, used to control the atomization circuit 102 to be turned on or turned off, is arranged in the battery assembly 20, and the storage for storing the puff number is arranged in the atomization assembly 10.

The main circuit 103 is a memory IC, which provides the puff number for the battery assembly 20 via the interface circuit 101, so that the battery assembly 20 controls the atomization circuit 102 to be disconnected and stopped from working when the puff number reaches the preset value. The controller controls the atomization circuit 102 to be turned on or turned off via the interface circuit 101.

Figure 3A:
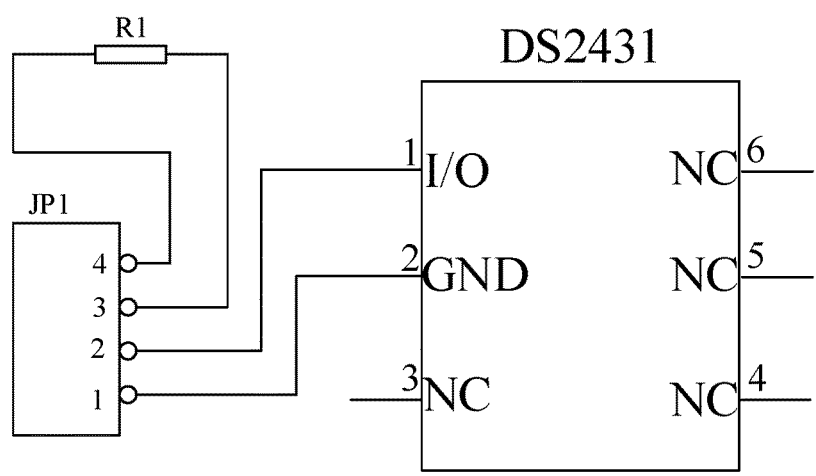
FIGS. 3A-3B illustrates a schematic circuit diagram of the atomization assembly based on memory IC, which is provided according to the embodiments of the present invention.

Referring to FIG. 3A, the atomization assembly 10 includes a memory IC (Integrated Circuit) used to storage some information such as the puff number and so on. In this embodiment, choosing a memory chip with type of DS2431 to be used as the IC for data storage. In addition, depending on the actual usage, the memory IC an also be in other types, such as ST24C02. As shown in FIG. 3A, the memory IC with type of DS2431 includes six pins (1—I/O, 2—GND, 3—NC, 4—NC, 5—NC, 6—NC). There are four terminals (1~4) set on the connector JP1 of the interface circuit 101. The terminal 2 and terminal 1 of the connector JP1 are connected with pin 1—I/O and pin 2—GND respectively. The terminal 3 and terminal 4 are respectively connected with the two ends of the heating resistance wire R1 of the atomization circuit 102.

The specific working principle of the circuit shown in FIG. 3A is as follows. After the battery assembly 20 has detected the user's smoking motion, and when the battery assembly 20 is physically connected with the atomization assembly 10 via the interface circuit 101, the controller of the battery assembly 20 communicates with the pin 1-I/O for data input and output of DS2431 via the terminal 2 of the connector JP1. The controller reads the remaining available puff number stored in DS2431, and compares the remaining available puff number to the preset value. If the remaining available puff number read currently is greater than the preset value (such as 1), it means that the electronic cigarette can be smoked continually. Thus, the battery assembly 20 supplies power to the resistance wire R1 via the terminals 3 and 4 of the connector JP1 to make the resistance wire R1 heat. If the remaining available puff number read currently is less than or equal to the preset value, it means that the electronic cigarette cannot be smoked any more. Thus, the battery assembly 20 stops supplying power to the resistance wire R1 to make the atomization circuit 102 be disconnected with power source and stop working. In actual implementation, once the user inhales a puff of smoke, the controller in the battery assembly 20 calculates the remaining available puff number stored in the memory IC of the atomization assembly 10 minus one, then the controller controls to update the remaining available puff number stored in the memory IC. For example, the puff number pre-stored in the memory IC is 300. When the user smokes, the controller in the battery assembly 20 reads the puff number of 300 from the memory IC of the atomization assembly 10. After the user inhales a puff of smoke, the controller calculates 300 minus 1, i.e. the remaining available puff number turns to be 299. Then, the remaining available puff number of 299 is written back to the memory IC of the atomization assembly 10. In this case, the preset value can be set to 1. When the puff number read by the controller is greater than or equal to 1, the battery assembly 20 supplies power to the resistance wire R1; when the puff number read by the controller is less than 1, the battery assembly 20 stops supplying power to the resistance wire R1.

After the battery assembly 20 reads the current puff number from the memory IC, it is certainly feasible by judging whether the puff number is less than or equal to the preset value (such as 299) or not. If the puff number read currently is less than or equal to the preset value, it means that the electronic cigarette can be smoked continually. Thus, the battery assembly 20 supplies power to the resistance wire R1 via the terminals 3 and 4 of the connector JP1 to make the resistance wire R1 heat. If the puff number read currently is greater than the preset value, it means that the electronic cigarette cannot be smoked any more. Thus, the battery assembly 20 stops supplying power to the resistance wire R1 to make the atomization circuit 102 be disconnected with power source and stop working. In actual implementation, once the user inhales a puff of smoke, the controller in the battery assembly 20 calculates the puff number stored in the memory IC of the atomization assembly 10 plus one. Then, the controller controls to update the puff number stored in the memory IC. For example, the puff number pre-stored in the memory IC is 0. When the user smokes, the controller in the battery assembly 20 reads the puff number of zero. After the user inhales a puff of smoke, the controller calculates zero plus one, i.e. the puff number turns to be 1. Then, the puff number of 1 is written back to the memory IC of the atomization assembly 10. In this case, the preset value can be set to 299. When the puff number read by the controller is less than or equal to 299, the battery assembly 20 supplies power to the resistance wire R1, when the puff number read by the controller is greater than 299, the battery assembly 20 stops supplying power to the resistance wire R1.

Figure 3B:
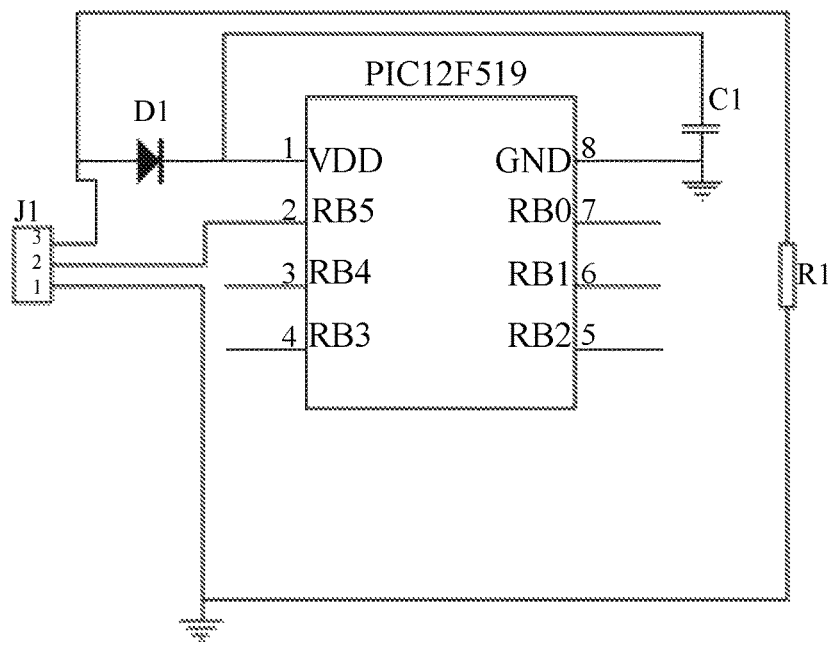

Additionally, the memory IC can also use a single chip processor (SCP) with a nonvolatile memory, or a FPGA with a nonvolatile memory and so on. Specifically, taking an example that the memory IC is the SCP with type of PIC12F519 to illustrate:

As shown in the FIG. 3B, the SCP of PIC12F519 includes eight pins (1—VDD, 2—RB5, 3—RB4, 4—RB3, 5—RB2, 6—RB1, 7—RB0, GND). There are three terminals (1~3) set on the connector J1 of the interface circuit 101. The terminal 3 of the connector J1 is connected with the power pin 1—VDD of SCP PIC12F519 via a diode D1. The terminal 2 of the connector J1 is connected with the pin 2—RB5 of SCP PIC12F519. The terminal 1 of the connector J1 is grounded. The terminal 1 and the terminal 3 are further respectively connected with the two ends of the heating resistance wire R1 of the atomization circuit 102. One end of the capacitance C1 is connected with the diode D1, and the other end of the capacitance C1 is grounded.

The specific working principle of the technical solution shown in FIG. 3B is as follows. The role of the pin 2—RB5 of the SCP is to communicate with the battery assembly 20, to determine whether to power on the atomization circuit 102 by the battery assembly 20 or not. The communication content that the SCP PIC12F519 responses to the battery assembly 20 may be the puff number or communication commands. Specifically, the communication commands are command 1 (means to power on) and command 2 (means not to power on). In actual implementation, after the battery assembly 20 has detected the user's smoking motion, and when the battery assembly 20 is physically connected with the atomization assembly 10 via the interface circuit 101, the battery assembly 20 supplies power to the SCP PIC12F519 of the atomization assembly 10 via the terminal 3 of the connector J1 (as shown in FIG. 3B). Specifically, a capacitance C1 is charged via the diode D1. The SCP PIC12F519 starts to work after the capacitance C1 is charged. Via pin 2—RB5, the SCP receives a reading command from the battery assembly 20. When the reading command is to ask the SCP to feedback the puff number, the SCP feedbacks the puff number to the battery assembly 20 via pin 2—RB5. Thus, the battery assembly 20 can implement a comparison between the preset value and the puff number read currently (the specific way of the comparison is the same as that shown in FIG. 3A, it is unnecessary to repeat here), to judge whether the atomization assembly 10 could work continually or not (i.e. whether the user could smoke continually or not). When the judgment result is no, stopping supplying power to the atomization assembly 10, and when the judgment result is yes, supplying power to the atomization assembly 10 continually (specifically, supplying power to the resistance wire R1). When the reading command is to ask the SCP to feedback the communication commands, the SCP reads the puff number stored inside, and implements a comparison between the preset value and the puff number read currently, to judge whether the atomization assembly 10 could work continually or not. When the judgment result is yes, the command 1 which means to power on the atomization circuit 102 is fed back to the battery assembly 20, so that the battery assembly 20 can supply power to the atomization assembly 10 continually. When the judgment result is no, the command 2 which means not to power on the atomization circuit 102 is fed back to the battery assembly 20, so that the battery assembly 20 stops supplying power to the atomization assembly 10. Additionally, in this case, after smoking, the processing strategy of "minus or plus" of the puff number stored in the SCP PIC12F519 is the same as that shown in FIG. 3A.

It should be pointed out here that, as shown in FIG. 3B, when the battery assembly 20 supplies power to the SCP PIC12F519 via the connector J1, the battery assembly 20 supplies power to the heating resistance wire R1 at the same time. However, it does not conflict with the technical solution of the present invention, because the time when the battery assembly 20 supplies power to the SCP PIC12F519 to obtain the command determining whether to power on the atomization circuit 102 or not, is too short to make the temperature of the resistance wire R1 rise to the level to atomize the tobacco tar. Even though a small amount of the tobacco tar is atomized, the time of atomization is too short to atomize the tobacco tar effectively. Therefore, even if the conclusion finally drew by the battery assembly 20 is not to power on the atomization circuit 102 (that is the electronic cigarette cannot be smoked by users), the bad result, such as scorch, will not appear.

2) The second case: the controller used to control the atomization circuit 102 to be turned on or turned off, and the storage for storing the puff number are both arranged in the atomization assembly 10.

A. It depends on one chip to realize the functions of the controller and the storage.

Figure 4:
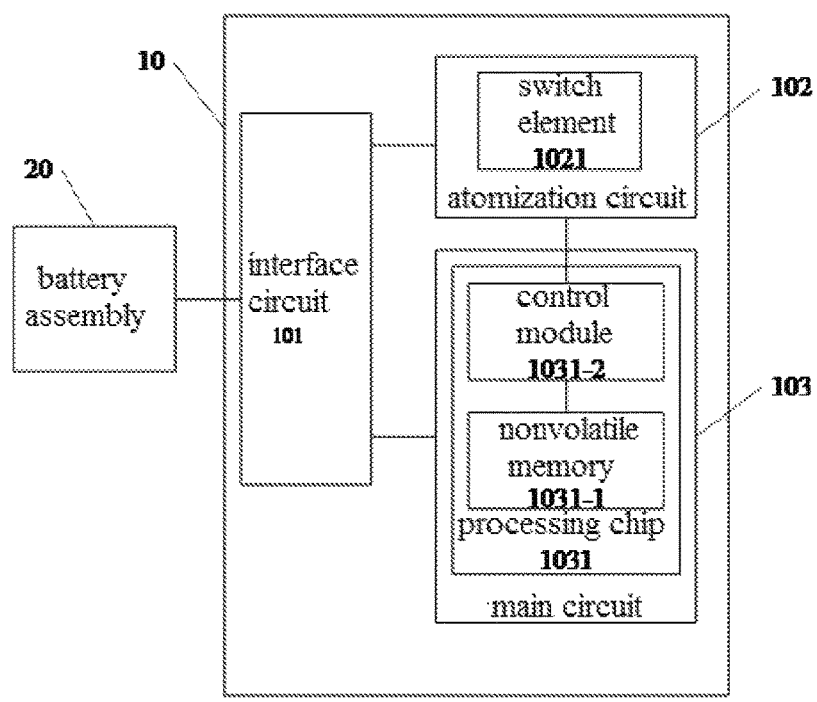
FIG. 4 illustrates a block diagram of a second atomization assembly connected with the battery assembly, which is provided according to the embodiments of the present invention.

Specifically, referring to FIG. 4, the main circuit 103 includes a processing chip 1031 with a built-in nonvolatile memory 1031-1. The nonvolatile memory 1031-1 is used to count the puff number according to the actual conducting times of the atomization circuit 102. The processing chip 1031 further includes a control module 1031-2 connected with the atomization circuit 102. The control module 1031-2 is used to receive the puff number from the nonvolatile memory 1031-1 after electrically communicated with the battery assembly 20 via the interface circuit 101, and control the atomization circuit 102 to be disconnected when the puff number reaches the preset value. The atomization circuit 102 includes a switch element 1021. The electronic cigarette controls the switch element 1021 to be turned off when the puff number reaches the preset value, in order to disconnect the atomization circuit 102. Specifically, it is feasible to control the switch element 1021 by the control module 1031-2.

Figure 5:
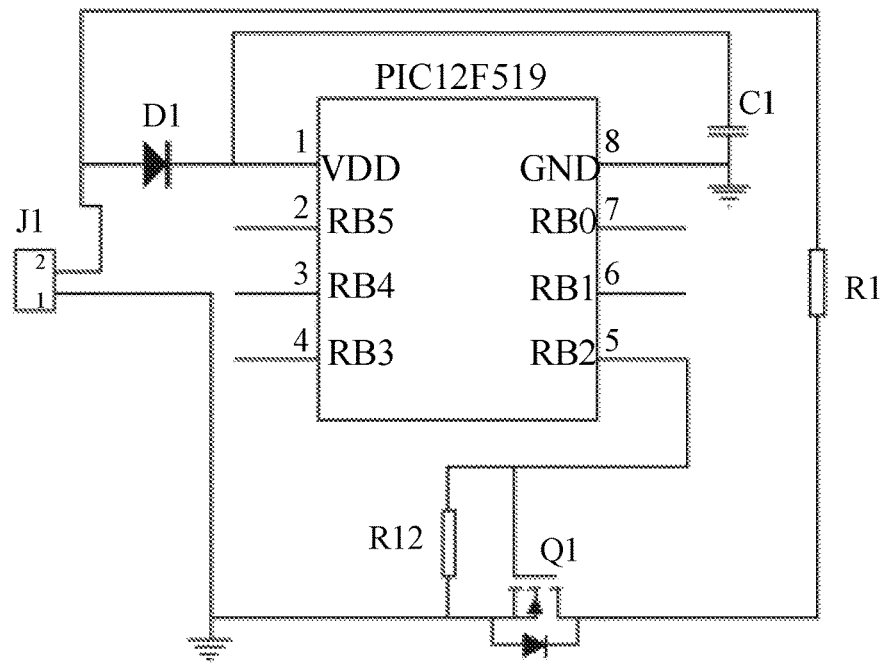
FIG. 5 illustrates a schematic circuit diagram of the atomization assembly based on single chip processor, which is provided according to the embodiments of the present invention.

In actual implementation, referring to FIG. 5, the processing chip 1031 is a SCP with type of PIC12F519. The SCP is provides with a FLASH memory (that is the nonvolatile memory 1031-1). The puff number can be stored in the FLASH or the program ROM. There are two terminals (1, 2) set on the connector J1 of the interface circuit 101. The terminal 1 is grounded. The terminal 2 is connected with the power pin 1—VDD of SCP PIC12F519 via the diode D1. One end of the capacitance C1 is connected with the diode D1, and the other end of the capacitance C1 is grounded. The switch element 1021 can be a MOSFET Q1. The source of the MOSFET Q1 is connected with the pin 5—RB2 of SCP PIC12F519. The resistor R13 is a leakage resistor set between the drain and the gate of the MOSFET Q1. One end of the heating resistance wire R1 is connected with the terminal 2 of the connector J1, and the other end of the heating resistance wire R1 is grounded (i.e. connected to the terminal 1 of the connector J1).

The specific working principle of the technical solution shown in FIG. 5 is as follows. After the battery assembly 20 has detected the user's smoking motion, and when the battery assembly 20 is physically connected with the atomization assembly 10 via the interface circuit 101, the battery assembly 20 supplies power to the modules of the atomization assembly 10 via the terminals (1,2) of the connector J1. Specifically, the capacitance C1 is charged via the diode D1. The SCP PIC12F519 starts to work after the capacitance C1 is charged. At this moment, the MOSFET Q1 is cutoff, so the heating resistance wire R1 is not conducted. After the SCP PIC12F519 works, the logic control module of the SCP PIC12F519 (i.e. the control module 1031-2 shown in FIG. 4, which is not shown in FIG. 5) checks the puff number stored in the FLASH or the program ROM, and compares the puff number to the preset value (the specific way of the comparison is the same as that shown in FIG. 3A, it is unnecessary to repeat here). When the comparison result illustrates that the electronic cigarette can be smoked continually, the SCP PIC12F519 outputs a high-level signal via the pin 5—RB2 to turn on the MOSFET Q1. Thus, the heating resistance wire R1 is connected with the power source, and users can smokes normally. When the comparison result illustrates that the electronic cigarette cannot be smoked any more, the SCP PIC12F519 outputs a low-level signal via the pin 5—RB2 to turn off the MOSFET Q1. Thus, the heating resistance wire R1 is disconnected with the power source and can't work anymore. In this case, after smoking, the processing strategy of "minus or plus" of the puff number stored in the FLASH or the program ROM is the same as that shown in FIG. 3A.

B. It depends on different chips to realize the functions of the Controller and the storage respectively.

Figure 6:
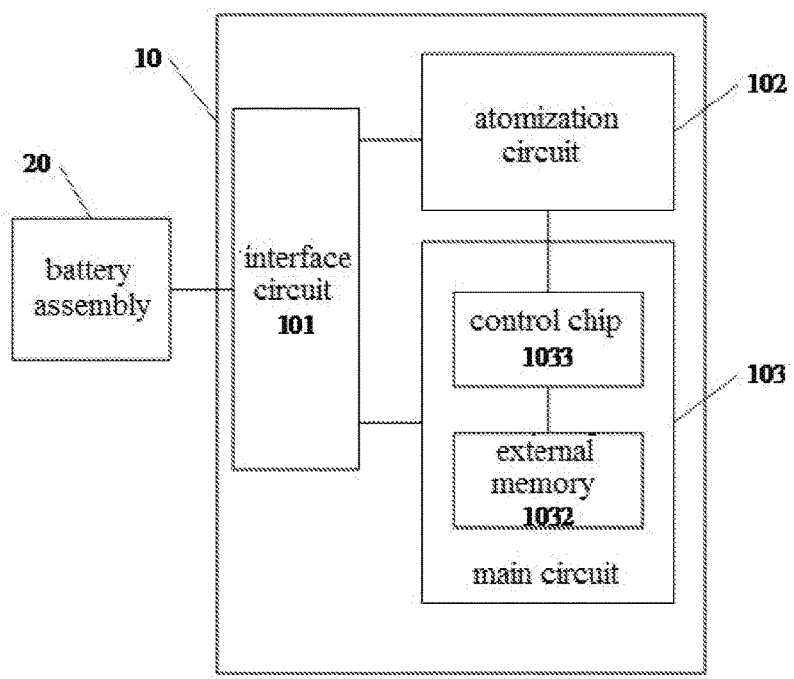
FIG. 6 illustrates a block diagram of a third atomization assembly, which is provided according to the embodiments of the present invention.

Specifically, referring to FIG. 6, the main circuit 103 includes an external memory 1032 used to count the puff number according to the actual conducting times of the atomization circuit 102, and a control chip 1033 (without a nonvolatile memory) connected with the external memory 1032 and the atomization circuit 102. The control chip 1033 is used to receive the puff number from the external memory 1032 after electrically communicated with the battery assembly 20 via the interface circuit 101, and control the atomization circuit 102 to be disconnected when the puff number reaches the preset value.

Figure 7:
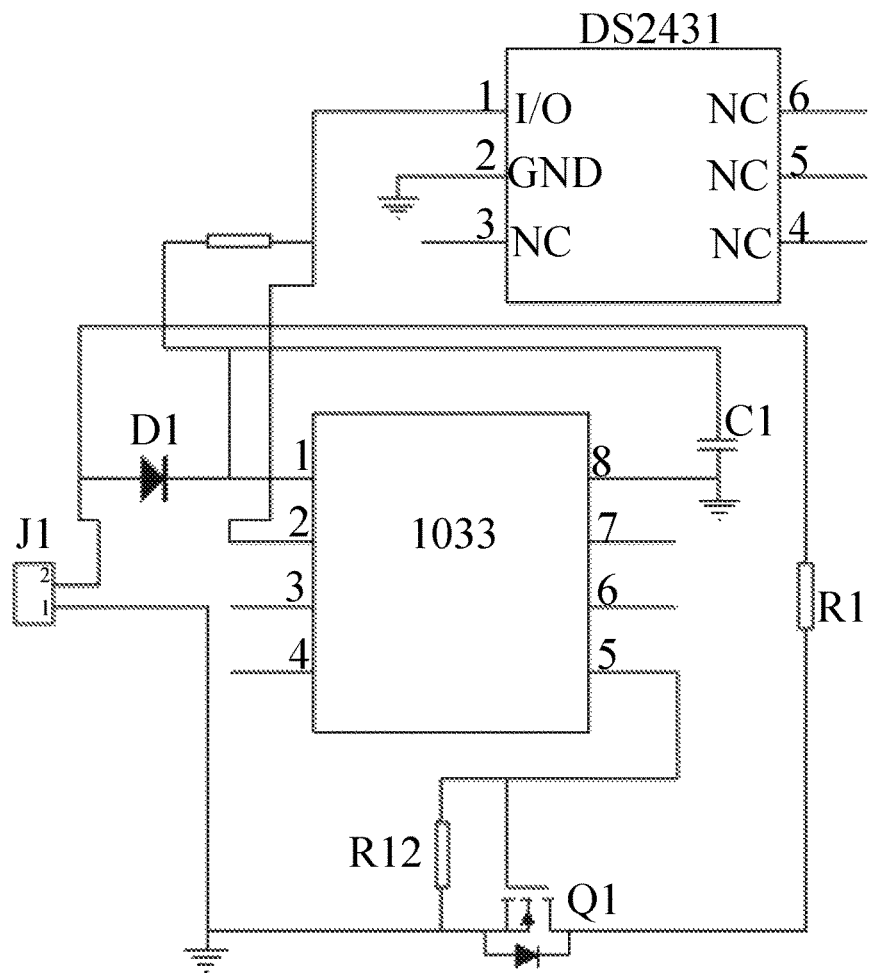
FIG. 7 illustrates a schematic circuit diagram of the atomization assembly based on single chip processor and memory IC, which is provided according to the embodiments of the present invention.

Referring to FIG. 7, in this embodiment, when the control chip 1033 chosen does not include a nonvolatile memory, an external memory 1032 connected to the control chip 1033 can be arranged outside the control chip 1033. The type of the nonvolatile memory is divers, such as DS2431 and ST34C02. As shown in FIG. 7, the peripheral circuits of the control chip 1033 are almost the same as that of the SCP PIC12F519 in the above-mentioned embodiment (shown in FIG. 5). Certainly, the connections between the pins of the control chip 1033 and the pins of the external memory 1032 (such as DS2431), depend on the type of the control chip 1033. Specifically, the connections can be determined referring to the application manuals of the control chip 1033 and the external memory 1032, and it is not specifically limited here. The specific working principle of the technical solution shown in FIG. 7 is the same as that shown in FIG. 5. The function of the external memory 1032 is equal to that of the nonvolatile memory 1031-1 mentioned above, and the function of the control chip 1033 is equal to that of the memory unit 1031-1 above-mentioned, so it is unnecessary to repeat here.

Further, in actual implementation, in order to judge exactly whether the atomization circuit 102 is actually conducted or not, and whether the heating resistance wire R1 atomizes the tobacco tar effectively or not, to make the statistics on the puff number more accurate, two solutions can be adopted. That is, the solution of temperature detection or current detection can be adopted to determine whether the atomization circuit 102 is actually conducted or not, and whether the heating resistance wire R1 atomizes the tobacco tar effectively or not.

Figure 8A:
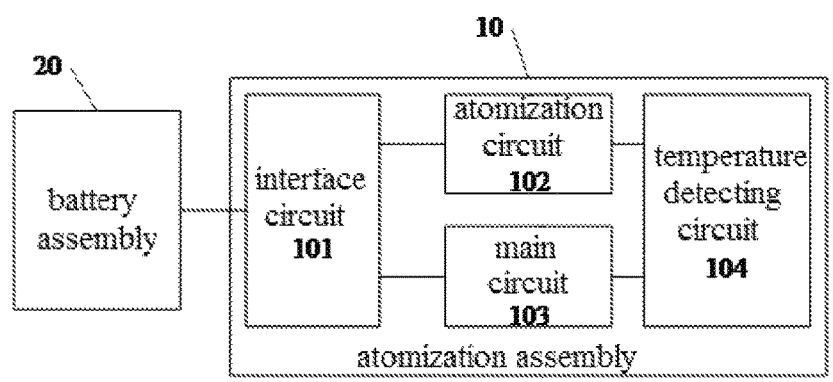
FIGS. 8A-8D illustrates four kinds of schematics for determining whether the atomization circuit is actually conducted or not, which are provided according to the embodiments of the present invention.

(1) The solution of the temperature detection: referring to FIG. 8A, the atomization assembly 10 further includes a temperature detecting circuit 104, connected with the atomization circuit 102 and the main circuit 103. The temperature detecting circuit 104 is used to detect a temperature signal of a heating device of the atomization circuit 102 after the main circuit 103 is electrically communicated with the battery assembly 20, and feedback the actual conduction situation of the atomization circuit 102 to the main circuit 103 based on the temperature signal.

Figure 8B:
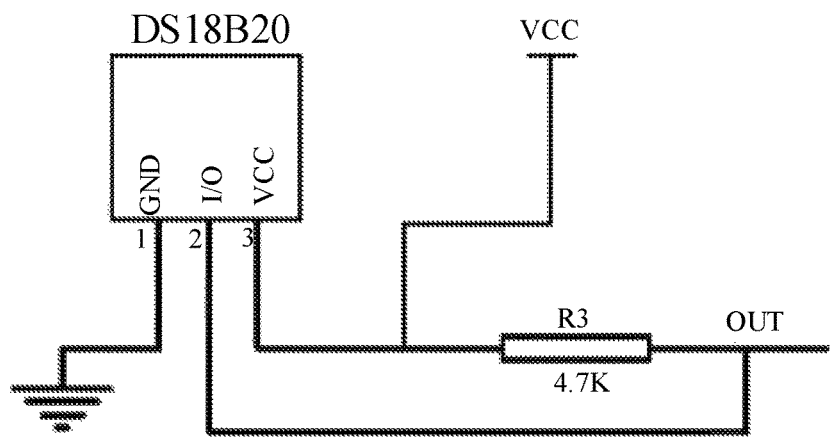

Specifically, FIG. 8B is a circuit principle diagram of the temperature detection based on a temperature sensor DS18B20. As shown in FIG. 8B, the temperature sensor DS18B20 includes three pins (1—GND, 2—I/O, 3—VCC). The pin 1—GND is grounded. The pin 2—I/O is connected to the main circuit 103, and outputs the temperature signal to the main circuit 103. The pin 3—VCC is connected to the power source VCC. The resistor R3 is a resistor of the peripheral circuit. The temperature detecting circuit 104 is adjoined to the heating device of the atomization circuit 102. When the temperature of the heating device is changed, the output pin 2—I/O of DS18B20 outputs a corresponding temperature signal, and transmits the temperature signal to the main circuit 103 via the terminal OUT. The main circuit 103 judges whether the temperature of the heating device has rose to the level to atomize the tobacco tar based on the temperature signal. When the judgment result is yes, a decision that the atomization circuit 102 is actually conducted is made, and the puff number is counted. Accordingly, when the judgment result is no, a decision that the atomization circuit 102 is not actually conducted is made, and the puff number is not counted.

Figure 8C:
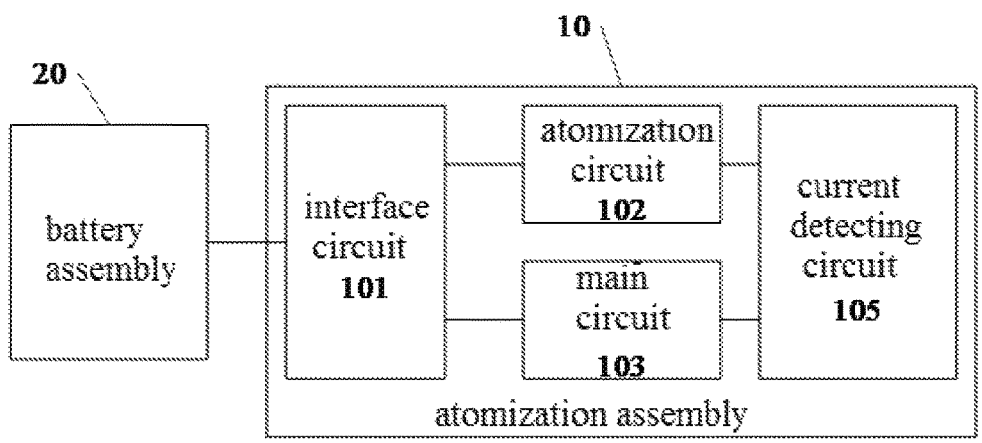

(2) The solution of the current detection: referring to FIG. 8C, the atomization assembly 10 further includes a current detecting circuit 105, connected with the atomization circuit 102 and the main circuit 103. The current detecting circuit 105 is used to detect a current signal of the atomization circuit 102 after the main circuit 103 is electrically communicated with the battery assembly 20, and feedback the actual conduction situation of the atomization circuit 102 to the main circuit 103 based on the current signal.

Figure 8D:
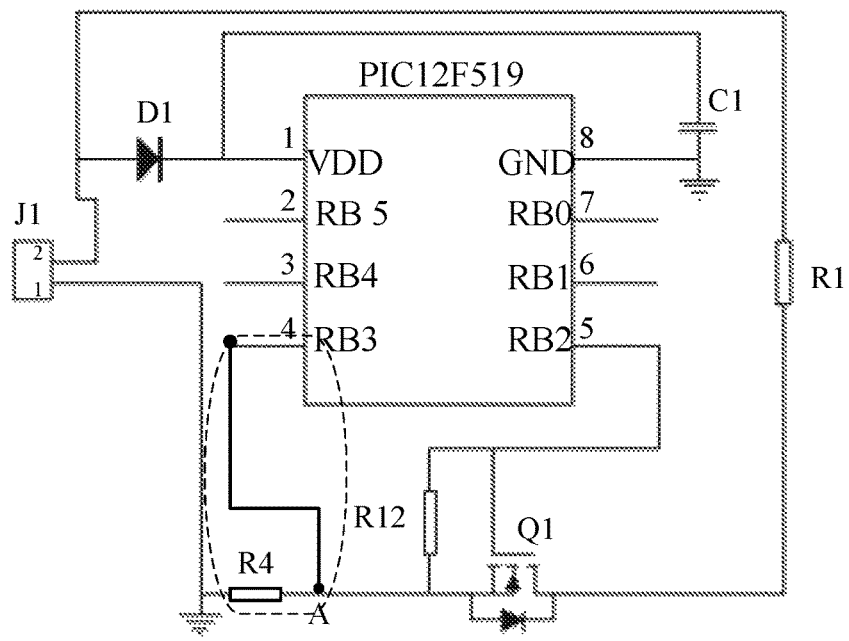

Specifically, FIG. 8D is an improvement of the FIG. 5. The improved part is shown as the part circled by a dotted block in FIG. 8D. There is the resistor R4 connected between the gate of MOSFET Q1 and the ground in series. A signal wire led out from the line between the resistor R4 and the gate of MOSFET Q1 is connected to a free pin (such as the pin 4—RB3) of the SCP PIC12F519. The design principle of the current detecting circuit is as follows. When the MOSFET Q1 is turned on and the resistor R1 is communicated with the battery assembly 20, a voltage difference is generated between the gate and source of MOSFET Q1. Thus, the pin 4—RB3 of the SCP PIC12F519 receives a high-level signal, and a decision that the atomization circuit 102 is actually conducted is made based on the high-level signal. The puff number is hence counted. When the MOSFET Q1 is turned on and the resistor R1 is uncommunicated with the battery assembly 20, that is to say, the resistor R1 is disconnected due to fault, the pin 4—RB3 of the SCP PIC12F519 receives a low-level signal, and a decision that the atomization circuit 102 is not actually conducted is made based on the low-level signal. Thus, the puff number is not counted.

In a word, in the embodiment of the present application, by rationally planning the internal circuits of the electronic cigarette, the electronic cigarette mainly includes two parts of the battery assembly and the atomization assembly. By setting the main circuit used to count the puff number into the atomization assembly, it is unable for the control unit, which controls the atomizer to be turned on or turned off based on the puff number, to operate the puff number stored in the atomization assembly, when the atomization assembly is disconnected with power source. Further, as the main circuit counts the puff number according to the actual conducting times of the atomization circuit, it is also unable for the control unit to operate the puff number stored in the atomization assembly when the atomization circuit is open (such as the resistive heater is breakdown), even though the main circuit is connected with the battery assembly at this moment. The control unit counts the puff number after ensuring that the atomization circuit is conducted and the resistive heater is actually working, and then the counted puff number is provided for the control unit. It can achieve a technical effect of exactly counting the puff number while limiting the puff number. By using the temperature detection and the current detection to determine whether the atomization circuit 102 is actually conducted or not, the accuracy of the statistics on the puff number is further improved, and the product consistency (i.e. the available puff number and the available tobacco tar are matched with each other) is effectively ensured.

Moreover, by setting the interface circuit into the atomization assembly, to achieve detachable assembly connection between the battery assembly and the atomization assembly, the connection points are centralized. The battery assembly communicates with the atomization assembly via the interface circuit, thus the organization of the communication signals are more clear, and the control logic of the communication signals are more simple. The design of the main circuit is diverse, which can be designed either based on a memory IC only or based on a control chip (such as a SCP) and a memory IC, to meet the needs of different applications. Furthermore, the price of the chip used as the atomization assembly is cheap. When the statistics of the puff number illustrates that the electronic cigarette cannot be smoked any more, it is needless to write program into the atomization assembly, and the whole atomization assembly can be replaced directly. The operation is simple, convenient and swift, which improves the user experience effectively.

The Second Embodiment

Figure 9A:
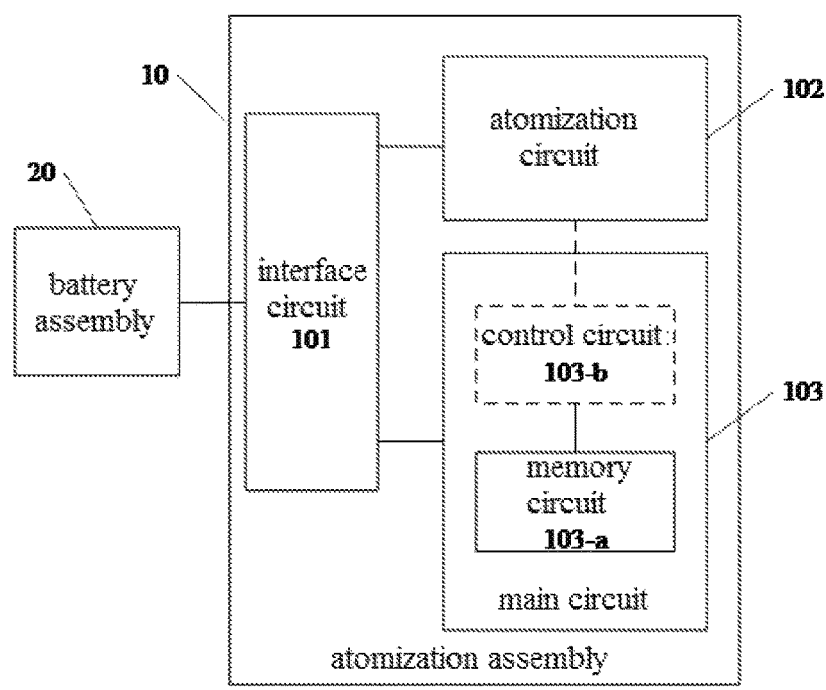
FIG. 9A-9B illustrates two kinds of block diagrams of an electronic cigarette with a limited lifetime, which are provided according to the embodiments of the present invention.
Figure 9B:
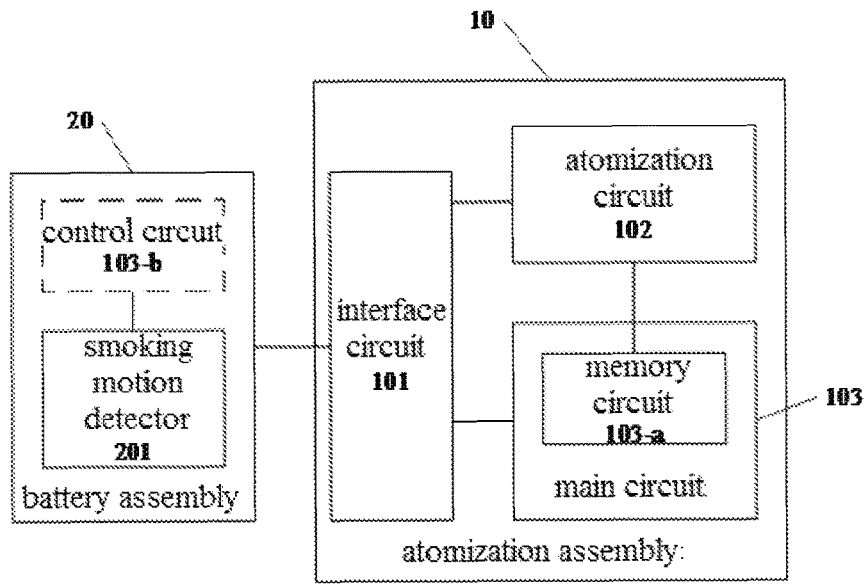

Based on a single general inventive concept, referring to FIGS. 9A and 9B, the present invention further discloses an electronic cigarette with a limited lifetime. The electronic cigarette includes an atomization assembly 10 and a battery assembly 20. The atomization assembly 10 provided with an interface circuit 101 detachably connected with the battery assembly 20, and an atomization circuit 102 connected with the interface circuit 101.

The electronic cigarette further includes a main circuit 103, which includes a memory circuit 103-*a* and a control circuit 103-*b*. The control circuit 103-*b* is provided in the atomization assembly 10 or the battery assembly 20. The memory circuit 103-*a* is provided in the atomization assembly 10.

The memory circuit 103-*a* is used to count puff number according to actual conducting times of the atomization circuit 102, and transfer the puff number to the control circuit 103-*b*, after electrically communicated with the battery assembly 20 via the interface circuit 101. The control circuit 103-*b* controls the atomization circuit 102 to be disconnected and stopped from working when the puff number reaches a preset value.

In actual implementation, the controller of an electronic cigarette is used to control the atomization circuit 102 to be turned on or turned off. The controller is provided in the atomization assembly 10 or the battery assembly 20, the following will respectively present the two cases:

1) The first case: the controller, used to control the atomization circuit 102 to be turned on or turned off, is provided in the battery assembly 20, and the storage for storing the puff number is provided in the atomization assembly 10.

Referring to FIG. 9B, the control circuit 103-*b* is provided in the battery assembly 20. The memory circuit 103-*a* is a memory IC, used to count the puff number according to the actual conducting times of the atomization circuit 102, and provide the puff number to the control circuit 103-*b*, when electrically communicated with the battery assembly 20. The control circuit 103-*b* controls the atomization circuit 102 to be disconnected and stopped from working when the puff number reaches the preset value. The memory IC provides the puff number for the control circuit 103-*b* via the interface circuit 101.

2) The second case: the controller used to control the atomization circuit 102 to be turned on or turned off, and the storage for storing the puff number are both provided in the atomization assembly 10.

A. It depends on one chip to realize the functions of the Controller and the storage.

Referring to FIG. 4 and FIG. 9A, the main circuit 103 includes a processing chip 1031 with a built-in nonvolatile memory 1031-1. The processing chip 1031 includes a memory circuit 103-*a* and a control circuit 103-*b*.

The memory circuit 103-*a* is the nonvolatile memory 1031-1, used to count the puff number according to the actual conducting times of the atomization circuit 102.

The control circuit 103-*b* is a control module 1031-2 built in the processing chip 1031 and connected with the atomization circuit 102. The control circuit 103-*b* is used to receive the puff number from the nonvolatile memory 1031-1 via the interface circuit 101, after electrically communicated with the battery assembly 20, and control the atomization circuit 102 to be disconnected when the puff number reaches the preset value.

B. It depends on different chips to realize the functions of the Controller and the storage respectively.

Referring to FIG. 6 and FIG. 9A, the main circuit 103 includes a memory circuit 103-*a* and a control circuit 103-*b*.

The memory circuit 103-*a* is an external memory 1032, used to count the puff number according to the actual conducting times of the atomization circuit 102.

The control circuit 103-*b* is a control chip 1033 (without a nonvolatile memory), connected with the external memory 1032 and the atomization circuit 102. The control chip 1033 is used to receive the puff number from the external memory 1032 after electrically communicated with the battery assembly 20 via the interface circuit 101, and control the atomization circuit 102 to be disconnected when the puff number reaches the preset value.

Further, still referring to FIG. 4, the atomization circuit 102 includes a switch element 1021.

The electronic cigarette controls the switch element 1021 to be turned off when the puff number reaches the preset value, in order to disconnect the atomization circuit 102.

In actual implementation, in order to judge exactly whether the atomization circuit 102 is actually conducted or not to make the statistics on the puff number more accurate, two solutions, i.e. the temperature detection and the current detection, can be selected to determine whether the atomization circuit 102 is actually conducted or not.

Figure 10A:
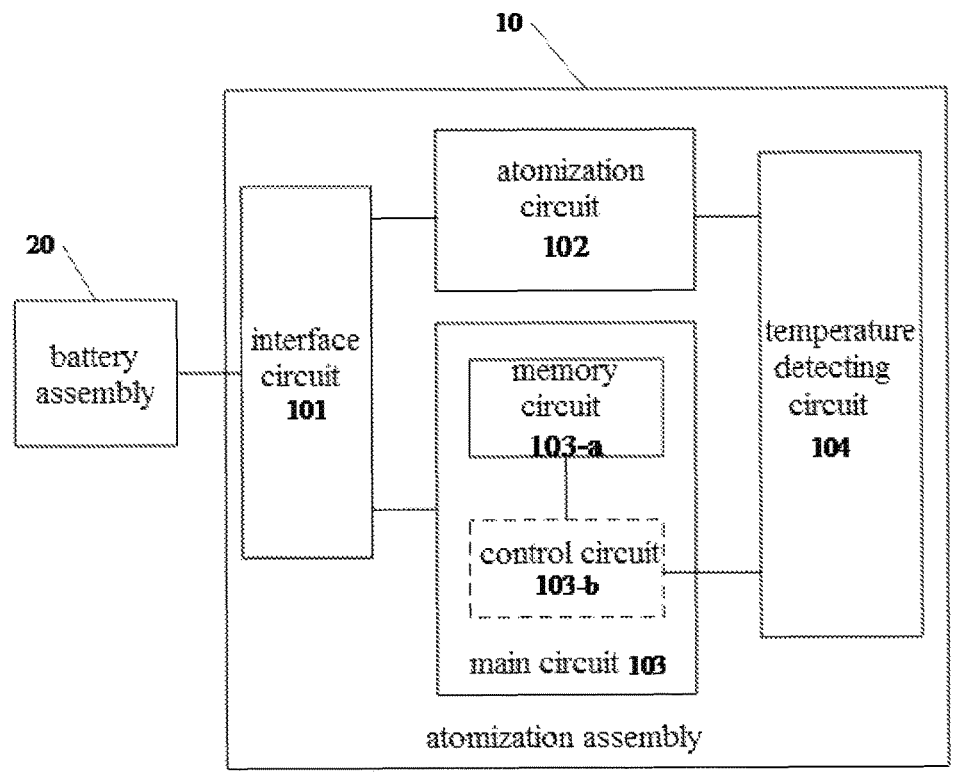

(1) The solution of the temperature detection: referring to FIG. 10A, the atomization assembly 10 further includes a temperature detecting circuit 104, connected with the atomization circuit 102 and the control circuit 103-*b*. The temperature detecting circuit 104 is used to detect a temperature signal of a heating device of the atomization circuit 102 after the control circuit 103-*b* is electrically communicated with the battery assembly 20, and feedback the actual conduction situation of the atomization circuit 102 to the control circuit 103-*b* based on the temperature signal.

(2) The solution of the current detection: referring to FIG. 10B, the atomization assembly 10 further includes a current detecting circuit 105, connected with the atomization circuit 102 and the control circuit 103-*b*. The current detecting circuit 105 is used to detect a current signal of the atomization circuit 102 after the control circuit 103-*b* is electrically communicated with the battery assembly 20, and feedback the actual conduction situation of the atomization circuit 102 to the control circuit 103-*b* based on the current signal.

It should be pointed out here that, as shown in FIGS. 10A and 10B, the control circuit 103-*b* is provided in the atomization assembly 10. In fact, the control circuit 103-*b* can also be provided in the battery assembly 20, and it is not specifically limited here.

In actual implementation, still referring to FIG. 9B, the battery assembly 20 includes a smoking motion detector 201, used to detect a user's smoking motion. After the smoking motion detector 201 has detected the user's smoking motion, and when the battery assembly 20 is physically connected with the atomization assembly 10 via the interface circuit 101, the battery assembly 20 supplies power to the main circuit 103 via the interface circuit 101.

According to the above description, the above-mentioned electronic cigarette with the limited lifetime includes the above-mentioned atomization assembly. Therefore, the implementation principle of the electronic cigarette is reflected in one or more embodiments of the above-mentioned atomization assembly, and it will not be detailed here.

The Third Embodiment

Based on a single general inventive concept, referring to FIG. 11, the present invention discloses a method of limiting a lifetime of an electronic cigarette, applied to the electronic cigarette of the above-mentioned second embodiment. The method includes steps as follows:

S1. After a battery assembly 20 is electrically communicated with an atomization assembly 10 via an interface circuit 101, receiving puff number according to actual conducting times of an atomization circuit 102;

S2. Controlling the atomization circuit 102 based on the puff number, and controlling the atomization circuit 102 to be disconnected when the puff number reaches a preset value, so that the electronic cigarette stops working.

According to the above description, the above-mentioned method of limiting the lifetime of the electronic cigarette is applied to the above-mentioned electronic cigarette with the limited lifetime. Therefore, on the premise that the implementation principle of the electronic cigarette is reflected in one or more embodiments of the above-mentioned atomization assembly, the implementation process of the method is illustrated by one or more embodiments of the above-mentioned atomization assembly, and it will not be detailed here.

It should be understood by those in the art that the embodiments of the present invention can be provided for a method, a system, or a computer program product. Therefore, the present invention can adopt a form of pure hardware implementation, pure software implementation, or a combination of software and hardware implementation. Moreover, the present invention can adopt a form of computer program product which is implemented on one or more storage media (including but not limited to disk storage, CD-ROM, optical storage, and so on) which is used by computers and contains a computer program code.

The present invention is described by referring to the flow chart and/or the block diagram according to the method, the equipment (system), and the computer program of the embodiments of present invention. It should be understood that every flow and/or block of the flow chart and/or block diagram, and the combination of the flow and/or block of the flow chart and/or block diagram, could be implemented by computer program instructions. These computer program instructions can be provided for the processor of a general computer, a specialized computer, an embedded processor or other programmable data processing equipment to produce a machine, so that the processor of computers or other programmable data processing equipment generates devices that can realize function appointed in one or more flows of the flow chart, and/or one or more blocks of the block diagram by executing the instructions.

These computer program instructions can also be stored in a computer readable storage that can lead computers or other programmable data processing equipment to work in a specified manner, so that the instructions stored in the computer readable storage generate manufacture that includes instruction device. The instruction device realizes function appointed in one or more flows of the flow chart, and/or one or more blocks of the block diagram.

These computer program instructions can also be loaded to computers or other programmable data processing equipment, so that computers or other programmable data processing equipment execute a series of operation steps to generate processing which can be realized by computers. Thus, the instructions executed in computers or other programmable data processing equipment provide steps used to realize function appointed in one or more flows of the flow chart, and/or one or more blocks of the block diagram.

Although the preferred embodiments of the present invention have been described, those with ordinary skill in the art can make other changes and modification for these embodiments as long as they know the basic concept of creativity. Therefore, the attached claims are to be interpreted as including the preferred embodiments and all the changes and modifications fallen into the protection scope of the present invention.

Obviously, those with ordinary skill in the art can make various changes and modification for these embodiments without breaking away from the spirit and protection scope of the present invention. In this case, if these changes and modification for the present invention are within the scope of the claims of the present invention and its equivalent technology, the present invention is also intent to include these changes and modification.

What is claimed is:

1. An atomization assembly, configured to be combined with a battery assembly to form an electronic cigarette, wherein the atomization assembly comprising an interface circuit (101) detachably connected with the battery assembly, an atomization circuit (102) and a main circuit (103); the atomization circuit (102) and the main circuit (103) are both connected with the interface circuit (101);

wherein the main circuit (103) is configured to count puff number according to actual conducting times of the atomization circuit (102), after electrically communicated with the battery assembly via the interface circuit (101), so that the electronic cigarette controls the atomization circuit (102) to be disconnected and stopped from working when the puff number reaches a preset value;

wherein the main circuit (103) is configured to count the puff number according to actual conducting times of the atomization circuit (102), and provide the puff number for the battery assembly when electrically communicated with the battery assembly, so that the battery assembly controls the atomization circuit (102) to be disconnected and stopped from working when the puff number reaches the preset value;

or the main circuit (103) is configured to count the puff number according to actual conducting times of the atomization circuit (102), and control the atomization circuit (102) to be disconnected and stopped from working when the puff number reaches the preset value; and wherein the main circuit (103) includes a processing chip (1031) with a built-in nonvolatile memory (1031-1);

the nonvolatile memory (1031-1) is configured to count the puff number according to the actual conducting times of the atomization circuit (102);

the processing chip (1031) further includes a control module (1031-2) connected with the atomization circuit (102); the control module (1031-2) is configured to receive the puff number from the nonvolatile memory after electrically communicated with the battery assembly via the interface circuit (101), and control the atomization circuit (102) to be disconnected when the puff number reaches the preset value.

2. The atomization assembly of claim 1, wherein the atomization circuit (102) includes a switch element (1021);

wherein the electronic cigarette controls the switch element (1021) to be turned off when the puff number reaches the preset value, in order to disconnect the atomization circuit (102).

3. The atomization assembly of claim 2, wherein the atomization assembly further comprising:

a temperature detecting circuit (106) connected with the atomization circuit (102) and the main circuit (103) respectively;

the temperature detecting circuit (106) is configured to detect a temperature signal of a heating device of the atomization circuit (102) after the main circuit (103) is electrically communicated with the battery assembly, and feedback an actual conduction situation of the atomization circuit (102) to the main circuit (103) based on the temperature signal.

4. The atomization assembly of claim 2, wherein the atomization assembly further includes a current detecting circuit (105) connected with the atomization circuit (102) and the main circuit (103);

the current detecting circuit (105) is used to detect a current signal of the atomization circuit (102) after the main circuit (103) is electrically communicated with the battery assembly, and feedback an actual conduction situation of the atomization circuit (102) to the main circuit (103) based on the current signal.

5. An electronic cigarette with a limited lifetime, wherein the electronic cigarette comprising: an atomization assembly (10) and a battery assembly (20); the atomization assembly (10) comprises an interface circuit (101) detachably connected with the battery assembly (20), and an atomization circuit (102) connected with the interface circuit (103);

the electronic cigarette further comprising a main circuit (103) which includes a memory circuit (103-*a*) and a control circuit (103-*b*); the control circuit (103-*b*) is defined in the atomization assembly (10) or the battery assembly (20); the memory circuit (103-*a*) is defined in the atomization assembly (10);

the memory circuit (103-*a*) is configured to count puff number according to actual conducting times of the atomization circuit (102), and transfer the puff number to the control circuit (103-*b*), after electrically communicated with the battery assembly (20) via the interface circuit (101), so that the control circuit (103-*b*) controls the atomization circuit (102) to be disconnected and stopped from working when the puff number reaches a preset value;

wherein the main circuit (103) includes a processing chip (1031) with a built-in nonvolatile memory (1031-1); the processing chip (1031) includes the memory circuit (103-*a*) and the control circuit (103-*b*);

the memory circuit (103-*a*) is the nonvolatile memory (1031-1), configured to count the puff number according to actual conducting times of the atomization circuit (102);

the control circuit (103-*b*) is a control module (1031-2) that is built in the processing chip (1031) and connected with the atomization circuit (102); the control circuit (103-*b*) is configured to receive the puff number from the nonvolatile memory (1031-1) after electrically communicated with the battery assembly (20) via the interface circuit (101), and control the atomization circuit (102) to be disconnected when the puff number reaches the preset value.

6. The electronic cigarette with the limited lifetime of claim 5, wherein the battery assembly (20) includes a smoking motion detector (201), the smoking motion detector (201) is configured to detect a user's smoking motion;

wherein the battery assembly (20) is configured to supply power to the main circuit (103) via the interface circuit (101) when the smoking motion detector (201) has detected the user's smoking motion, and the battery assembly (20) is physically connected with the atomization assembly (10) via the interface circuit (101).

7. A method of limiting a lifetime of an electronic cigarette, used to limit the lifetime of the electronic cigarette of claim 5, wherein the method includes steps as follows:

S1. after the battery assembly (20) is electrically communicated with the atomization assembly (10) via the interface circuit (101), receiving the puff number according to the actual conducting times of the atomization circuit (102);

S2. controlling the atomization circuit (102) based on the puff number, and controlling the atomization circuit (102) to be disconnected when the puff number reaches the preset value to stop the electronic cigarette from working.

8. The electronic cigarette with the limited lifetime of claim 5, wherein the atomization circuit (102) includes a switch element (1021);

wherein the electronic cigarette is configured to control the switch element (1021) to be turned off when the puff number reaches the preset value, in order to disconnect the atomization circuit (102).

9. The electronic cigarette with the limited lifetime of claim 8, wherein the atomization assembly (10) further comprises a temperature detecting circuit (104) connected with the atomization circuit (102) and the main circuit (103-*b*) respectively; the temperature detecting circuit (104) is configured to detect a temperature signal of a heating device of the atomization circuit (102) after the control circuit (103-*b*) is electrically communicated with the battery assembly (20), and feedback an actual conduction situation of the atomization circuit (102) to the control circuit (103-*b*) based on the temperature signal.

10. The electronic cigarette with the limited lifetime of claim 8, wherein the atomization assembly (10) further comprises a current detecting circuit (105) connected with the atomization circuit (102) and the control circuit (103-*b*); the current detecting circuit (105) is configured to detect a current signal of the atomization circuit (102) after the control circuit (103-*b*) is electrically communicated with the battery assembly (20), and feedback an actual conduction situation of the atomization circuit (102) to the control circuit (103-*b*) based on the current signal.

\* \* \* \* \*